No. 688,235. Patented Dec. 3, 1901.
J. H. CRADDOCK.
TELLURIAN.
(Application filed Jan. 30, 1901.)
(No Model.) 2 Sheets—Sheet 2.
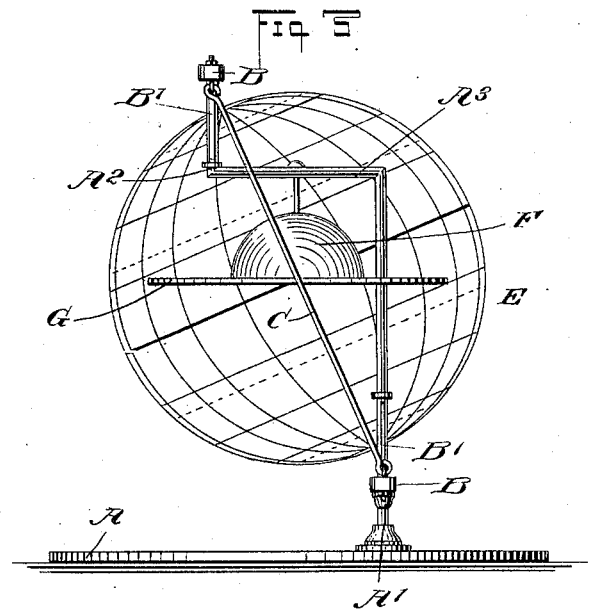
WITNESSES:
INVENTOR
John H. Craddock
BY
ATTORNEYS

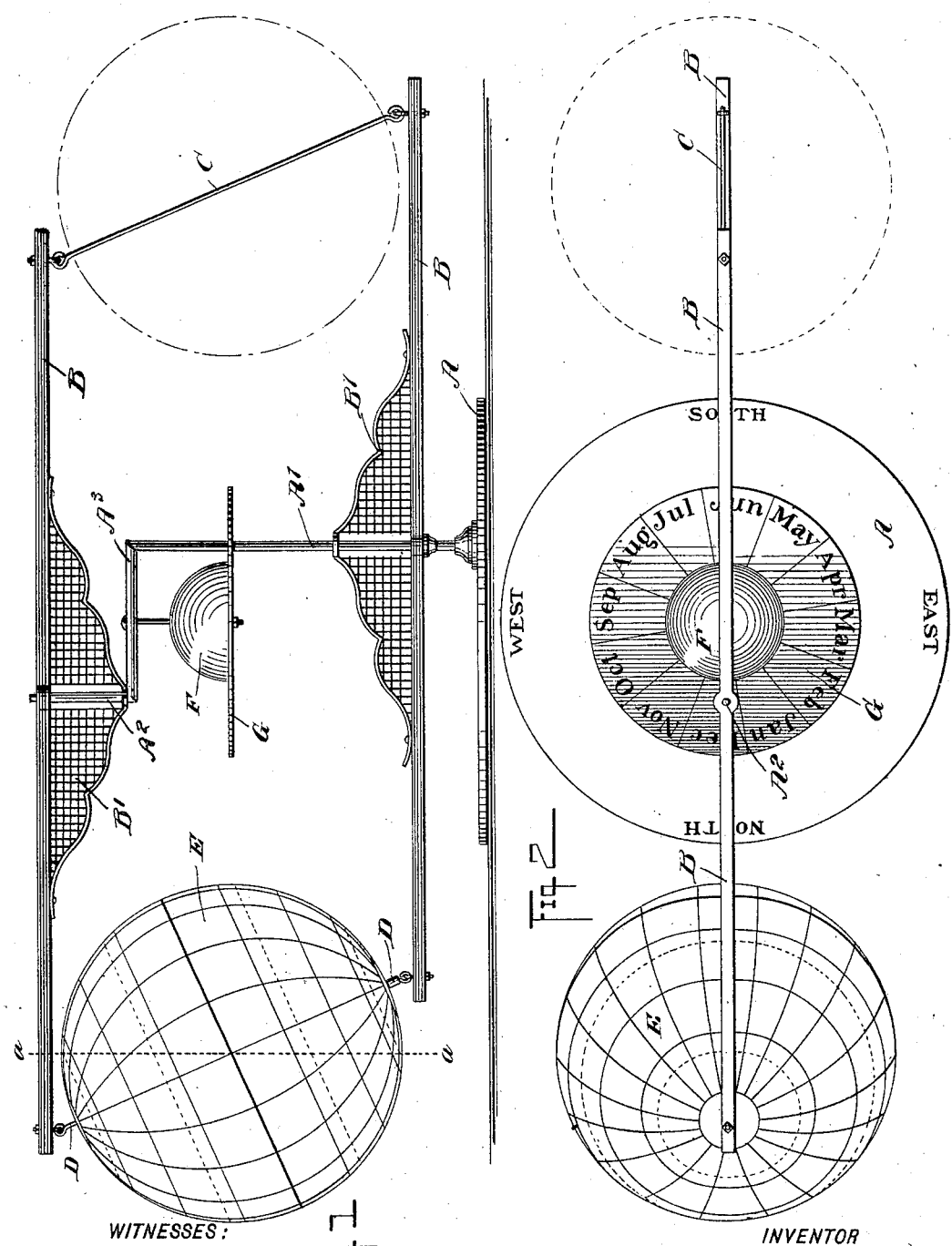

UNITED STATES PATENT OFFICE.

JOHN H. CRADDOCK, OF KNOWLESVILLE, NEW YORK.

TELLURIAN.

SPECIFICATION forming part of Letters Patent No. 688,235, dated December 3, 1901.

Application filed January 30, 1901. Serial No. 45,345. (No model.)

*To all whom it may concern:*

Be it known that I, JOHN H. CRADDOCK, a citizen of the United States, and a resident of Knowlesville, in the county of Orleans and State of New York, have invented new and useful Improvements in Tellurians, of which the following is a full, clear, and exact description.

My invention relates to tellurians, and has for its object to provide a simple, durable, and efficient device of this class which will illustrate in a readily intelligible manner the earth's motion upon its axis and around the sun, the alternation of day and night, the varying length of the day according to latitude and season, and other facts and phenomena connected with the earth's motion.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 is a front elevation of my improved tellurian. Fig. 2 is a plan thereof, and Fig. 3 is a front elevation of the apparatus with the parts in a position different from that shown in Fig. 1.

The improved tellurian comprises a base A, from which rises a standard or support A', which is preferably stationary. This standard has an upper portion $A^2$ out of line with its lower portion, the two portions being connected by a horizontal cross member $A^3$. On the two vertical portions of the standard A' are journaled two swinging supports B, extending in parallel (horizontal) planes and so located relatively to each other that a line drawn from one pivot or journal to the other will form an angle of twenty-three and one-half degrees with the direction of the standard A' or with a vertical line. To keep the supports B in their proper planes of rotation, I prefer to provide them with braces B'. The supports B are connected at one end by a rod or link C, arranged at an angle of twenty-three and one-half degrees to the vertical, and at the other end they carry pins D, provided at their inner ends with balls, (not shown,) engaging corresponding sockets in the globe E, representing the earth. Meridians and parallels are marked on this globe in the usual way, and preferably a map of the world is provided, although this has not been shown. The equator, tropics, and polar circles are distinctively indicated. From the center of the cross member $A^3$ is suspended a hemispherical or inverted-cup-shaped body F, representing the sun, and provided at its bottom with a plane board G, representing the ecliptic plane. This board, as shown in Fig. 2, is provided on its upper surface with radiating lines dividing it into twelve sections, in which are indicated the names of the months. On the base A are produced the indications "North," "South," "East," and "West" to guide the teacher and pupil as to the direction of the earth's movement around the sun.

In Figs. 1 and 2 the apparatus is shown adjusted to illustrate the conditions obtaining at the winter solstice, (about December 21.) The apparatus clearly shows that the earth is in perihelion—that is, as near to the sun as it ever comes in its orbit—and that the majority of the sun's rays fall upon the Southern Hemisphere, the direct or vertical rays (those in the plane of the ecliptic) falling upon the tropic of the Capricorn, thus showing that summer is beginning in the Southern Hemisphere and that at noon the sun will be at the zenith for localities on the tropic of the Capricorn. The apparatus also shows that the sun's rays fall much more obliquely upon the Northern Hemisphere (where winter is beginning) than upon the Southern Hemisphere and that the sun's rays which are tangent to the earth fall upon the northern polar circle, indicating that at that latitude the night lasts twenty-four hours. The diameters of the globe E and of the sun-body F should be of proper proportions to show these indications, and the ecliptic board G should be located in a plane half-way between the poles of the globe E, so that the ecliptic plane will always pass through the center of the globe. An imaginary line drawn through the point of intersection of the equator with the ecliptic, as represented by the line *a a* in Fig. 1, will indicate the division of day and night over the world, the parts to the left of said line having night and the others day. This line may be indicated by holding a ruler vertically against the proper point of the equator. The declination of the sun at noon can also be readily figured for any point of the globe, being, for instance, twenty-three and one-half degrees south for any point of the equator. By turning the supports B on their pivots the varying conditions as they occur with the changing seasons can be faithfully reproduced. Such movement will show, for instance, that the earth's axis always remains parallel to itself, (pointing to the north pole of the stellar space.) This is secured by the connection of the supports B, so arranged that they form a parallellogram with the link C and the axis of the globe E. The apparatus will show, further, that day and night are always of equal length at the equator, that at the autumn equinox (about September 21, see Fig. 3) the sun is at the zenith at noon for any point of the equator, that day and night are of equal length for all the points of the earth, and that the sun's rays reach both poles. These and other capabilities of my apparatus will be clear to any person familiar with the principles of astronomy.

Having thus described my invention, I claim as new and desire to secure by Letters Patent—

1. A tellurian comprising a standard having a central member and parallel end members extending therefrom in opposite directions, a body, representing the sun, carried by said central member, supports pivoted to the end members, and a globe carried by said supports and having its axis arranged obliquely thereto.

2. A tellurian comprising a standard having an upper and a lower portion arranged out of alinement, supports pivoted to said portions to move in parallel planes, a globe carried by said supports and having its axis arranged obliquely thereto, and a body, representing the sun, located centrally between the portions of the standard.

3. A tellurian comprising a standard having a central member and parallel end members extending therefrom in opposite directions, supports pivoted to said end members, a globe rotatably carried between said supports and having its axis arranged obliquely thereto, and a curved body, representing the sun, carried by said central member and provided, in a plane passing through the globe's center, with a plane surface indicating the ecliptic plane.

4. A tellurian comprising a standard having an upper and a lower portion arranged out of alinement, supports pivoted to said portions to move in parallel planes, a globe rotatably carried between said supports and having its axis arranged obliquely thereto, and a body representing the sun, located centrally between the portions of the standard.

5. A tellurian comprising a standard having an upper and a lower portion arranged out of alinement, supports pivoted to said portions to move in parallel planes, a globe rotatably carried between said supports and having its axis arranged obliquely thereto, and a body representing the sun, located centrally between the portions of the standard and provided, in a plane passing through the globe's center, with a board or plane surface indicating the ecliptic plane and divided into twelve sections.

In testimony whereof I have signed my name to this specification in the presence of two subscribing witnesses.

JOHN H. CRADDOCK.

Witnesses:
ERNEST A. ROLL,
MILES G. LUTTENTON.